United States Patent
Yamane et al.

(10) Patent No.: US 9,185,550 B2
(45) Date of Patent: Nov. 10, 2015

(54) VEHICLE WIRELESS COMMUNICATION APPARATUS

(75) Inventors: Katsuyasu Yamane, Shioya-gun (JP); Shinichi Ueda, Shimotsuke (JP); Hiroto Sakai, Niiza (JP); Masahiko Takagi, Niiza (JP)

(73) Assignees: HONDA MOTOR CO., LTD., Tokyo (JP); HONDA ACCESS CORP., Niza-Shi (JP)

( * ) Notice: Subject to any disclaimer, the term of this patent is extended or adjusted under 35 U.S.C. 154(b) by 266 days.

(21) Appl. No.: 13/881,487

(22) PCT Filed: Sep. 8, 2011

(86) PCT No.: PCT/JP2011/070474
§ 371 (c)(1),
(2), (4) Date: Apr. 25, 2013

(87) PCT Pub. No.: WO2012/056814
PCT Pub. Date: May 3, 2012

(65) Prior Publication Data
US 2013/0212221 A1    Aug. 15, 2013

(30) Foreign Application Priority Data
Oct. 29, 2010 (JP) .................................. 2010-243974

(51) Int. Cl.
*G06F 15/16* (2006.01)
*H04W 8/24* (2009.01)
(Continued)

(52) U.S. Cl.
CPC .................. *H04W 8/24* (2013.01); *B60R 16/02* (2013.01); *B60R 25/24* (2013.01); *G07C 5/008* (2013.01); *H04W 4/046* (2013.01)

(58) Field of Classification Search
USPC ........................ 709/217; 340/12.28; 307/10.1
See application file for complete search history.

(56) References Cited

U.S. PATENT DOCUMENTS 6,140,938 A * 10/2000 Flick .......................... 340/12.28

FOREIGN PATENT DOCUMENTS

| CN | 101271602 | 9/2008 |
|---|---|---|
| CN | 101648551 | 2/2010 |

(Continued)

OTHER PUBLICATIONS

Chinese Office Action dated Oct. 29, 2014, Application No. 201180051430.0, 8 pages.

(Continued)

*Primary Examiner* — Kyung H Shin
(74) *Attorney, Agent, or Firm* — Rankin, Hill & Clark LLP

(57) ABSTRACT

A vehicle wireless communication apparatus, including: a first portable device; a second portable device; a first receiver; a second receiver; a control apparatus; an in-vehicle communication network; and a relay unit, wherein, on receiving first directive data transmitted from the first portable device, the first receiver transmits first identification data of the first portable device to the relay unit; on receiving second directive data transmitted from the second portable device, the second receiver transmits second identification data of the second portable device to the relay unit; and on receiving the first identification data transmitted from the first portable device or the second identification data transmitted from the second portable device, the relay unit transmits more-recently received data to the control apparatus as identification data continuously at predetermined regular intervals.

3 Claims, 2 Drawing Sheets

(51) Int. Cl.
  *B60R 25/24*    (2013.01)
  *G07C 5/00*     (2006.01)
  *B60R 16/02*    (2006.01)
  *H04W 4/04*     (2009.01)

(56) References Cited

FOREIGN PATENT DOCUMENTS

| CN | 101766005 | 6/2010 |
|---|---|---|
| CN | 201590823 | 9/2010 |
| DE | 10103044 | 7/2002 |
| EP | 2211310 | 7/2010 |
| JP | 2005-207019 | 8/2005 |
| JP | 2006-233534 | 9/2006 |
| JP | 2006-336420 | 12/2006 |
| JP | 2007-162309 | 6/2007 |
| JP | 2009-073421 | 4/2009 |
| JP | 2009-234467 | 10/2009 |

OTHER PUBLICATIONS

European Search Report dated May 19, 2014, 4 pages.

\* cited by examiner

VEHICLE WIRELESS COMMUNICATION APPARATUS

FIELD OF THE INVENTION

This invention relates to a vehicle wireless communication apparatus.

Priority is claimed on Japanese Patent Application No. 2010-243974, filed on Oct. 29, 2010, the content of which is incorporated herein by reference.

RELATED ART

Conventionally, there is known a keyless entry system that is set, for example, between a plurality of portable devices and an in-vehicle communication device so as to be wirelessly communicable and that controls the drive of the in-vehicle equipment in response to the control instructions that are wirelessly transmitted from the respective portable devices to the in-vehicle communication device (for example, refer to Patent Document 1).

In this keyless entry system, different drive control (for example, control of setting various pieces of in-vehicle equipment to a default state preset for every portable device, when the doors of a stopped motor vehicle are unlocked, and other controls) can be exercised for every portable device in response to identification data unique to every portable device, which data is wirelessly transmitted from every portable device. When drive control in response to identification data of the portable devices for the in-vehicle equipment that has received the identification data is exercised, the signals of the identification data of the portable devices are continuously input to various pieces of in-vehicle equipment in an intermittent manner such as at predetermined regular intervals because different pieces of in-vehicle equipment operate at different operational timings.

REFERENCE DOCUMENT

Patent Document

Patent Document 1: Japanese Unexamined Patent Application, First Publication No. 2005-207019

DISCLOSURE OF THE INVENTION

Problems to be Solved by the Invention

However, in a motor vehicle provided with the keyless entry system according to the aforementioned conventional technique, there are cases where another remote control system such as a remote engine start system is added as an option. In these cases, a second in-vehicle communication device and second portable devices, which are different from the existing in-vehicle communication device and portable devices that constitute the keyless entry system, are added independently of the existing remote control system (namely, the keyless entry system), and the drive control of the in-vehicle equipment is configured to be available also in response to the control instructions wirelessly transmitted from the second portable devices to the second in-vehicle communication device.

However, if, in this condition, signals of identification data is output from the portable devices of both of the remote control systems independent of each other, the identification data of the portable devices of the first system and the identification data of the portable devices of the second system are continuously input to the in-vehicle equipment. This may prevent proper drive control of the in-vehicle equipment, or may prevent proper operation of a new remote control system (for example, a remote engine start system) that is added to the existing remote control system (namely, the keyless entry system).

The present invention has been achieved in view of the above circumstances, and has an object to provide a vehicle wireless communication apparatus that is capable of properly performing remote control of in-vehicle equipment.

Methods for Solving the Problem

To solve the above problems and achieve the object, the present invention adopts the following.
(1) An aspect of the present invention is a vehicle wireless communication apparatus, including: a first portable device that wirelessly transmits unique first identification data at predetermined regular intervals or in accordance with either a first predetermined operation or a receipt of a request signal transmitted from a vehicle and is also capable of wirelessly transmitting first directive data for directing a predetermined piece of in-vehicle equipment to exercise a second predetermined operation; a second portable device that wirelessly transmits unique second identification data at predetermined regular intervals or in accordance with either a first predetermined operation or a receipt of a request signal transmitted from a vehicle and is also capable of wirelessly transmitting second directive data for directing a predetermined piece of in-vehicle equipment to exercise a second predetermined operation; a first receiver capable of receiving data that is transmitted from the first portable device; a second receiver capable of receiving data that is transmitted from the second portable device; a control apparatus that performs a second predetermined operation based on the first identification data and the second identification data; an in-vehicle communication network that connects the first receiver and the second receiver to the control apparatus in a communicable manner; and a relay unit that is connected to the in-vehicle communication network, and that receives the first identification data and the second identification data transmitted respectively from the first portable device and the second portable device and transmits the first identification data and the second identification data to the control apparatus, wherein, on receiving the first directive data transmitted from the first portable device, the first receiver transmits the first identification data of the first portable device to the relay unit; on receiving the second directive data transmitted from the second portable device, the second receiver transmits the second identification data of the second portable device to the relay unit; and on receiving the first identification data transmitted from the first portable device or the second identification data transmitted from the second portable device, the relay unit transmits more-recently received data to the control apparatus as identification data continuously at predetermined regular intervals.
(2) In the vehicle wireless communication apparatus as forth above in (1), a plurality of the control apparatuses may be connected to the in-vehicle communication network, and the control apparatuses may start an operation based on the identification data at different timings.

Effects of the Invention

According to the structure as set forth above in (1), on receiving pieces of directive data (first directive data, second directive data) transmitted from the portable devices, the first receiver and the second receiver transmit either piece of the identification data to the relay unit only once at every reception of the directive data. On receiving the first identification data or the second identification data, the relay unit transmits the received data to the control apparatus as identification data continuously at predetermined regular intervals.

As a result, the identification data transmitted to the control apparatus continuously at predetermined regular intervals is the first identification data or second identification data that has been received more recently by the relay unit, to thereby make it possible to prevent the mixture of the first identification data continuously transmitted to the control apparatus and the second identification data continuously transmitted to the control apparatus. Therefore, even if a plurality of remote control systems are mounted in a motor vehicle, it is possible to allow the remote control systems to properly control the in-vehicle equipment, and hence, to improve convenience.

According to the structure as set forth above in (2), even if a plurality of control apparatuses start operations based on the identification data at different timings, it is possible to secure proper operations because the identification data is transmitted from the relay unit to each of the control apparatuses continuously at predetermined regular intervals.

EMBODIMENTS OF THE INVENTION

Hereunder is a description of a vehicle wireless communication apparatus according to an embodiment of the present invention with reference to the appended drawings.

Figure 1:
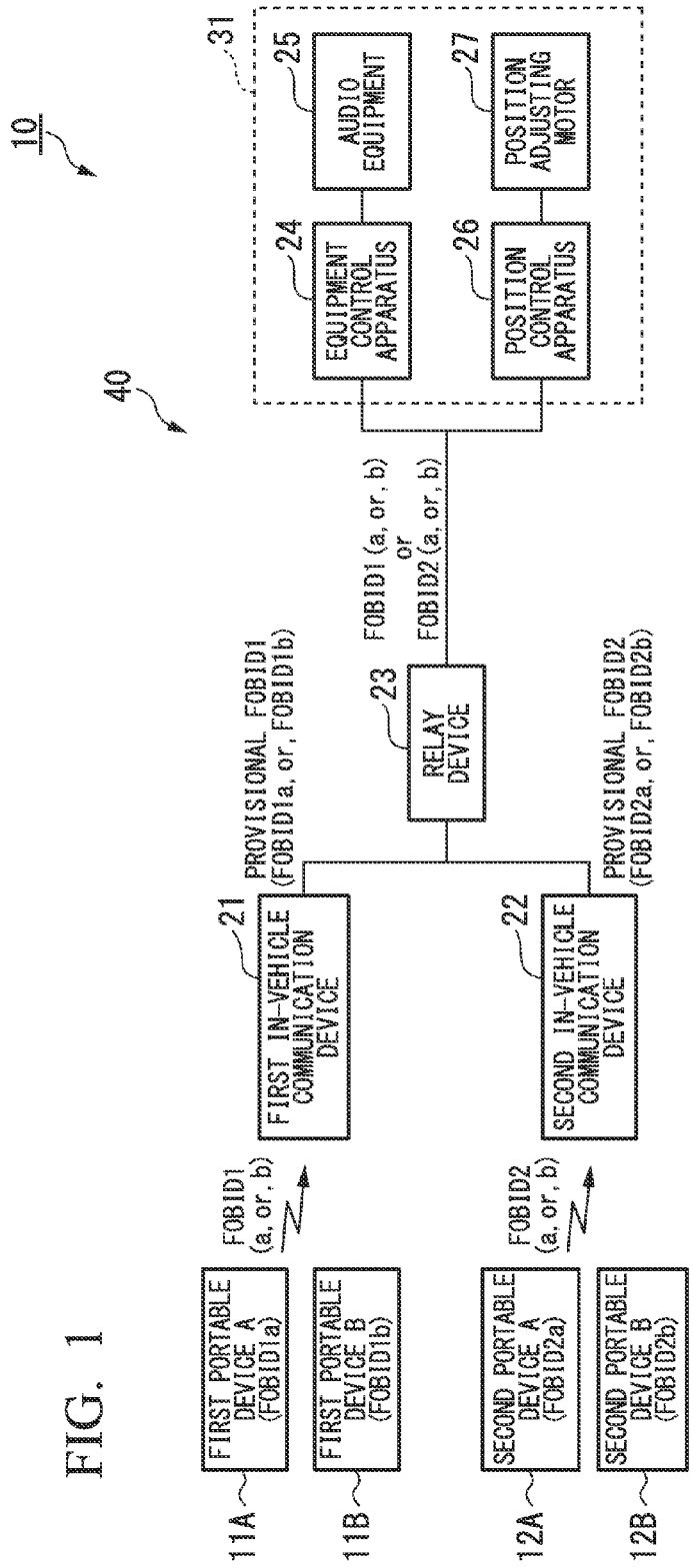
FIG. 1 is a block diagram showing a vehicle wireless communication apparatus according to an embodiment of the present invention.

A vehicle wireless communication apparatus 10 according to the present embodiment is made of: a plurality of (for example, two) first portable devices 11A, 11B; a plurality of (for example, two) second portable devices 12A, 12B; a first in-vehicle communication device 21; a second in-vehicle communication device 22; a relay device 23; and in-vehicle equipment 31 including an equipment control apparatus 24, audio equipment 25, a position control apparatus 26, and a position adjusting motor 27, as shown in FIG. 1, for example.

The first in-vehicle communication device 21, the second in-vehicle communication device 22, the relay device 23, and the in-vehicle equipment 31 including the equipment control apparatus 24, the audio equipment 25, the position control apparatus 26, and the position adjusting motor 27 are mutually connected to form an in-vehicle communication network 40.

The first portable devices 11A, 11B and the first in-vehicle communication device 21 form a first remote control system such as a keyless entry system. The first portable devices 11A, 11B wirelessly transmit pieces of first identification data, which are unique respectively thereto, (for example, FOBID1a of the first portable device 11A and FOBID1b of the first portable device 11B) to the first in-vehicle communication device 21 at predetermined regular intervals, and is capable of wirelessly transmitting directive data, which directs a predetermined piece of in-vehicle equipment to exercise a second predetermined operation, to the first in-vehicle communication device 21.

Each of the portable devices 11A, 11B is capable of receiving signals transmitted from the first in-vehicle communication device 21, and transmits signals in accordance with a first predetermined operation or the like on each of the portable devices 11A, 11B to the first in-vehicle communication device 21.

The signals transmitted from each of the portable devices 11A, 11B to the first in-vehicle communication device 21 refer to, for example, a reply signal that replies to a request signal transmitted from the first in-vehicle communication device 21, to a signal made of directive data that directs a predetermined piece of in-vehicle equipment 31 to exercise a second predetermined operation, and to other signals, and include first identification data unique to each of the portable devices 11A, 11B (for example, FOBID1a for the first portable device 11A, and FOBID1b for the first portable device 11B).

Second predetermined operations of a predetermined piece of in-vehicle equipment 31 whose execution is directed from each of the portable devices 11A, 11B include, for example, starting or stopping of an internal combustion engine, and unlocking or locking of vehicle doors by the drive of a door lock unit.

The first in-vehicle communication device 21, for example, receives signals transmitted from each of the portable devices 11A, 11B, and also transmits signals to each of the portable devices 11A, 11B.

The signals transmitted from the first in-vehicle communication device 21 to each of the portable devices 11A, 11B include, for example, a request signal that is transmitted intermittently.

If a signal made of directive data that directs a predetermined piece of in-vehicle equipment 31 to exercise a second predetermined operation from each of the portable devices 11A, 11B is received, the first in-vehicle communication device 21 transmits the signal to the in-vehicle equipment 31.

If first identification data unique to each of the portable devices 11A, 11B (for example, FOBID1a of the first portable device 11A and FOBID1b of the first portable device 11B) is received, the first in-vehicle communication device 21 transmits the first identification data (namely, FOBID1a or FOBID1b) to the relay device 23 as provisional FOBID1 at every reception of the first identification data.

The second portable devices 12A, 12B and the second in-vehicle communication device 22 form a second remote control system such as a remote engine start system. The second portable devices 12A, 12B wirelessly transmit pieces of second identification data, which are unique respectively thereto (for example, FOBID2a, FOBID2b) to the second in-vehicle communication device 22 at predetermined regular intervals, and is capable of wirelessly transmitting directive data, which directs a predetermined piece of in-vehicle equipment to exercise a second predetermined operation, to the second in-vehicle communication device 22.

Each of the portable devices 12A, 12B is capable of receiving signals transmitted from the second in-vehicle communication device 22, and transmits signals in accordance with a first predetermined operation or the like on each of the portable devices 12A, 12B to the second in-vehicle communication device 22.

The signals transmitted from each of the portable devices 12A, 12B to the second in-vehicle communication device 22 refer to, for example, a signal made of directive data that directs a predetermined piece of in-vehicle equipment 31 to exercise a second predetermined operation, and other signals, and include second identification data unique to each of the portable devices 12A, 12B (for example, FOBID2*a* of the second portable device 12A and FOBID2*b* of the second portable device 12B).

Second predetermined operations of a predetermined piece of in-vehicle equipment 31 whose execution is directed from each of the portable devices 12A, 12B include, for example, starting or stopping of an internal combustion engine, and unlocking or locking of the vehicle doors by the drive of a door lock unit.

The second in-vehicle communication device 22, for example, receives signals transmitted from each of the portable devices 12A, 12B and also transmits signals to each of the portable devices 12A, 12B.

The signals transmitted from the second in-vehicle communication device 22 to each of the portable devices 12A, 12B include, for example, an answerback signal that contains data regarding a vehicle state.

If a signal made of directive data that directs a predetermined piece of in-vehicle equipment 31 to exercise a second predetermined operation from each of the portable devices 12A, 12B is received, the second in-vehicle communication device 22 transmits the signal to the in-vehicle equipment 31.

If second identification data unique to each of the portable devices 12A, 12B (for example, FOBID2*a* of the second portable device 12A and FOBID2*b* of the second portable device 12B) is received, the second in-vehicle communication device 22 transmits the second identification data (namely, FOBID2*a* or FOBID2*b*) to the relay device 23 as provisional FOBID2 at every reception of the second identification data.

Of the provisional FOBID1 transmitted from the first in-vehicle communication device 21 (namely, FOBID1*a* or FOBID1*b*) and the provisional FOBID2 transmitted from the second in-vehicle communication device 22 (namely, FOBID2*a* or FOBID2*b*), the relay device 23 transmits the more-recently-received one to the in-vehicle equipment 31 as identification data continuously at predetermined regular intervals.

In response to the signals transmitted from the portable devices 11A, 11B, 12A, and 12B, the equipment control apparatus 24 controls an operation of the audio equipment 25.

For example, when the doors of a stopped motor vehicle are unlocked by use of a signal which has been transmitted from any one of the portable devices 11A, 11B, 12A, and 12B for directing the unlocking of the doors of the motor vehicle, the equipment control apparatus 24 sets the audio equipment 25 to a pre-stored default state in response to the identification data transmitted from the relay device 23.

In the equipment control apparatus 24, data of the default state of the audio equipment 25 is stored in association with each piece of identification data for each of the portable devices 11A, 11B, 12A, and 12B. The stored data is updated according to, for example, the state of the audio equipment 25 at the time when the motor vehicle, which has been actuated by a signal transmitted from any one of the portable devices 11A, 11B, 12A, and 12B, is stationary.

In response to the signal transmitted from any one of the portable devices 11A, 11B, 12A, and 12B, the position control apparatus 26 controls an operation of the position adjusting motor 27. The position adjusting motor 27 is a motor that is driven for adjusting, for example, the front-back positions of the seats, angles and vertical positions of the backrests, or a front-back position and vertical position of the steering wheel, or vertical positions and lateral positions of the door mirrors.

For example, in unlocking the doors of a stopped motor vehicle by use of a signal which has been transmitted from any one of the portable devices 11A, 11B, 12A, and 12B for directing the unlocking of the doors of the motor vehicle, the position control apparatus 26 drives the position adjusting motor 27 so as to set various pieces of in-vehicle equipment related to a driving position and the like to a pre-stored default state in response to the identification data transmitted from the relay device 23.

In the position control apparatus 26, data regarding the default states of the various pieces of in-vehicle equipment related to the driving position and the like is stored in association with each piece of identification data for each of the portable devices 11A, 11B, 12A, and 12B. The stored data is updated according to, for example, the state of the various pieces of in-vehicle equipment at the time when the motor vehicle, which has been actuated by a signal transmitted from any one of the portable devices 11A, 11B, 12A, and 12B, is stationary.

The vehicle wireless communication apparatus 10 according to the present embodiment has a structure as described above. Next, an operation of the vehicle wireless communication apparatus 10, especially an operation of the relay device 23 will be described.

Figure 2:
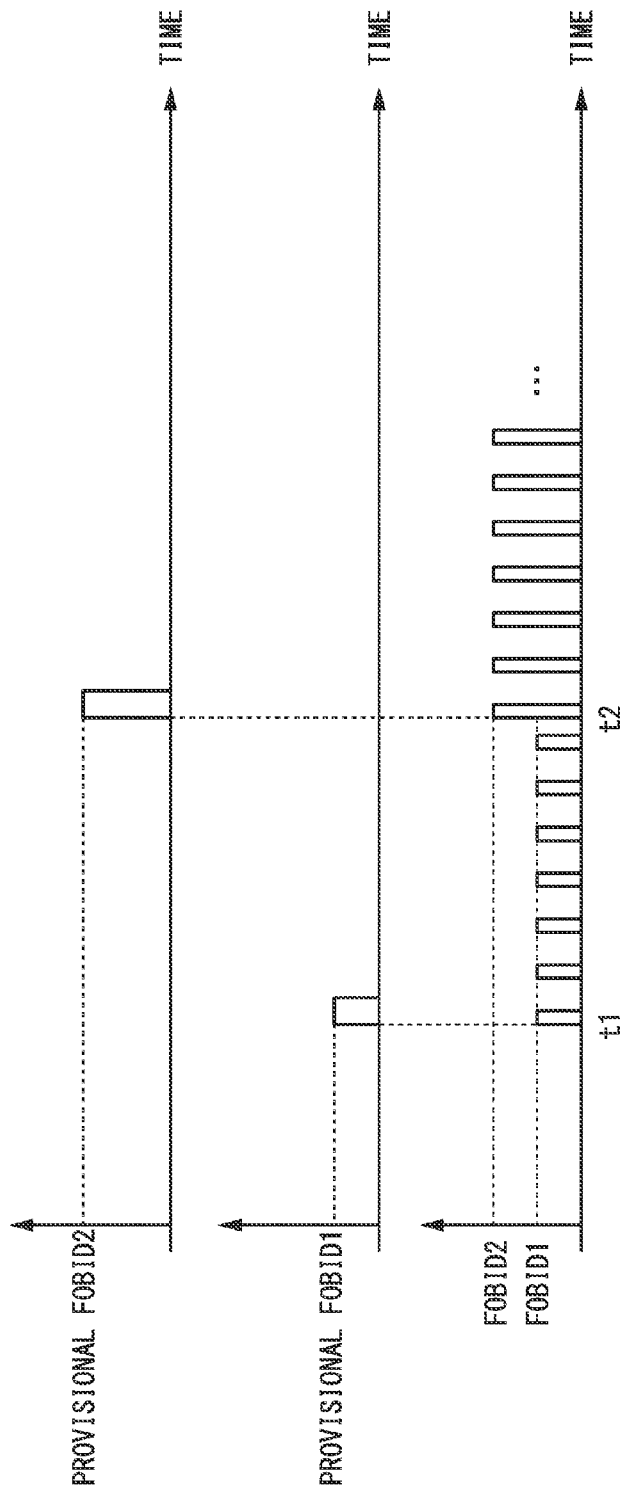
FIG. 2 is a timing chart showing exemplary input/output signals in a relay device of the vehicle wireless communication apparatus according to the embodiment of the present invention.

For example, the case will be described where an unlocking operation on the doors of a stopped motor vehicle by use of a signal which has been transmitted from any one of the portable devices 11A, 11B, 12A, and 12B for directing the unlocking of the doors of the motor vehicle. For example, as shown in FIG. 2, at time t1, if either piece of the first identification data (FOBID1*a* and FOBID1*b*) unique respectively to each of the portable devices 11A, 11B is received by the first in-vehicle communication device 21, the first identification data (FOBID1*a* or FOBID1*b*) received by the first in-vehicle communication device 21 is transmitted to the relay device 23 as provisional FOBID1.

When received by the relay device 23, the provisional FOBID1 (FOBID1*a* or FOBID1*b*) is transmitted to the in-vehicle equipment 31 as identification data continuously at predetermined regular intervals.

Then, for example, at time t2, which is after the time t1, if either piece of the second identification data (FOBID2*a* and FOBID2*b*) unique respectively to each of the portable devices 12A, 12B is received by the second in-vehicle communication device 22, the second identification data (FOBID2*a* or FOBID2*b*) received by the second in-vehicle communication device 22 is transmitted to the relay device 23 as provisional FOBID2.

When received by the relay device 23, the provisional FOBID2 (FOBID2*a* or FOBID2*b*), instead of the provisional FOBID1 (FOBID1*a* or FOBID1*b*) that has been set as the identification data by this point of time, is transmitted to the in-vehicle equipment 31 continuously at predetermined regular intervals as identification data.

As a result, finally, in response to the more recent identification data that has been transmitted from the relay device 23, namely, the provisional FOBID2 (FOBID2*a* or FOBID2*b*), each of the control apparatuses 24, 26 begins to control the audio equipment 25 and the position adjusting motor 27 at predetermined timing that is set for each of the control apparatuses 24, 26.

As described above, according to the vehicle wireless communication apparatus 10 of the present embodiment, on receiving signals transmitted from the portable devices 11A, 11B, 12A, and 12B, the first in-vehicle communication device 21 and the second in-vehicle communication device 22 transmit any one piece of the identification data to the relay device 23 only once at every reception of the signals. On receiving the first identification data or the second identification data, the relay device 23 transmits the received data to the control apparatuses 24, 26 as identification data continuously at predetermined regular intervals.

As a result, the identification data transmitted to each of the control apparatuses 24, 26 continuously at predetermined regular intervals is the first identification data or the second identification data that has been received more recently by the relay device 23, to thereby make it possible to prevent the mixture of the first identification data continuously transmitted to each of the control apparatuses 24, 26 and the second identification data continuously transmitted to each of the control apparatuses 24, 26. Therefore, even if a plurality of remote control systems are mounted in a motor vehicle, it is possible to allow the remote control systems to properly control the in-vehicle equipment 31, and hence, to improve convenience.

In addition, even if the control apparatuses 24, 26 start operations based on the identification data at different timings, it is possible to secure proper operations because the identification data is transmitted from the relay device 23 to each of the control apparatuses 24, 26 continuously at predetermined regular intervals In the aforementioned embodiment, the remote control systems have been described as a keyless entry system and a remote engine start system. However, the present invention is not limited to this, and other systems may be adopted.

INDUSTRIAL APPLICABILITY

According to the present invention, it is possible to provide a vehicle wireless communication apparatus capable of properly performing remote control of in-vehicle equipment.

REFERENCE SYMBOL LIST

10: vehicle wireless communication apparatus
11A, 11B: first portable device
12A, 12B: second portable device
21: first in-vehicle communication device (first receiver)
22: second in-vehicle communication device (second receiver)
23: relay device (relay unit)
24: equipment control apparatus (control apparatus)
26: position control apparatus (control apparatus)
40: in-vehicle communication network

The invention claimed is:

1. A vehicle wireless communication apparatus, comprising:
   a first portable device that wirelessly transmits unique first identification data at predetermined regular intervals or in accordance with either a predetermined operation of the first portable device or a receipt of a request signal transmitted from a vehicle, and is also capable of wirelessly transmitting first directive data for directing a predetermined piece of in-vehicle equipment to exercise a predetermined operation of the in-vehicle equipment associated with the first portable device;
   a second portable device that wirelessly transmits unique second identification data at predetermined regular intervals or in accordance with either a predetermined operation of the second portable device or a receipt of a request signal transmitted from a vehicle, and is also capable of wirelessly transmitting second directive data for directing the predetermined piece of in-vehicle equipment to exercise a predetermined operation of the in-vehicle equipment associated with the second portable device;
   a first receiver capable of receiving data that is transmitted from the first portable device;
   a second receiver capable of receiving data that is transmitted from the second portable device;
   a control apparatus that performs the predetermined operation of the in-vehicle equipment associated with the first portable device and the predetermined operation of the in-vehicle equipment associated with the second portable device based on the first identification data and the second identification data;
   an in-vehicle communication network that connects the first receiver and the second receiver to the control apparatus in a communicable manner; and
   a relay unit that is connected to the in-vehicle communication network, and that receives the first identification data and the second identification data transmitted respectively from the first portable device and the second portable device and transmits the first identification data and the second identification data to the control apparatus,
   wherein, on receiving the first directive data transmitted from the first portable device, the first receiver transmits the first identification data of the first portable device to the relay unit;
   on receiving the second directive data transmitted from the second portable device, the second receiver transmits the second identification data of the second portable device to the relay unit; and
   on receiving the first identification data transmitted from the first portable device or the second identification data transmitted from the second portable device, the relay unit selectively transmits more-recently received data among the first identification data and the second identification data to the control apparatus as identification data continuously at predetermined regular intervals.

2. The vehicle wireless communication apparatus according to claim 1,
   wherein a plurality of the control apparatuses are connected to the in-vehicle communication network, and the control apparatuses start an operation based on the identification data at different timings.

3. The vehicle wireless communication apparatus according to claim 1,
   wherein the control apparatus has a storage unit which stores information of a default-state in association with the first identification data and the second identification data, the default-state being a state of the various in-vehicle equipment at the time when the vehicle is actuated by a signal transmitted from the first portable device or the second portable device and the vehicle is still stationary.

* * * * *